US006842693B2

(12) United States Patent
Nagamune

(10) Patent No.: US 6,842,693 B2
(45) Date of Patent: Jan. 11, 2005

(54) COMMUNICATION NAVIGATION SYSTEM, COMMUNICATION NAVIGATION METHOD, ROUTE GUIDANCE INFORMATION TRANSMITTING DEVICE, AND TERMINAL UNIT

(75) Inventor: Akira Nagamune, Tokyo-to (JP)

(73) Assignees: Pioneer Corporation, Tokyo-to (JP); Increment P Corporation, Tokyo-to (JP)

( * ) Notice: Subject to any disclaimer, the term of this patent is extended or adjusted under 35 U.S.C. 154(b) by 0 days.

(21) Appl. No.: 10/208,004

(22) Filed: Jul. 31, 2002

(65) Prior Publication Data

US 2003/0028314 A1 Feb. 6, 2003

(30) Foreign Application Priority Data

Jul. 31, 2001 (JP) ..................................... P2001-232556

(51) Int. Cl.[7] ............................................. G01C 21/34
(52) U.S. Cl. .................. 701/202; 701/211; 340/995.12; 340/995.2
(58) Field of Search ................................ 701/202, 209, 701/210, 211; 340/995.12, 995.19, 995.2

(56) References Cited

U.S. PATENT DOCUMENTS

| 5,187,810 A | * | 2/1993 | Yoneyama et al. ......... 455/509 |
| 5,999,126 A | | 12/1999 | Ito |
| 6,097,316 A | | 8/2000 | Liaw et al. |
| 6,278,939 B1 | * | 8/2001 | Robare et al. .............. 701/208 |
| 6,278,941 B1 | * | 8/2001 | Yokoyama ................... 701/209 |
| 6,282,492 B1 | * | 8/2001 | Gorai et al. ................. 701/209 |
| 6,320,518 B2 | | 11/2001 | Saeki et al. |
| 6,324,467 B1 | | 11/2001 | Machii et al. |
| 6,336,073 B1 | * | 1/2002 | Ihara et al. ................. 701/202 |
| 6,542,816 B1 | * | 4/2003 | Ito et al. ..................... 701/209 |
| 6,587,787 B1 | | 7/2003 | Yokota |
| 2001/0007090 A1 | | 7/2001 | Irie et al. |
| 2002/0065606 A1 | * | 5/2002 | Kawai et al. ............... 701/211 |
| 2003/0028313 A1 | | 2/2003 | Nagamune et al. |
| 2003/0028314 A1 | | 2/2003 | Nagamune |
| 2003/0028317 A1 | | 2/2003 | Nagamune |
| 2003/0074130 A1 | | 4/2003 | Negishi et al. |
| 2003/0083851 A1 | | 5/2003 | Nagamune |

FOREIGN PATENT DOCUMENTS

| EP | 0 696 774 | 2/1996 |
| EP | 0 738 876 | 10/1996 |
| EP | 0 766 216 | 4/1997 |
| JP | 09-330025 | 12/1997 |

* cited by examiner

Primary Examiner—Gary Chin
(74) Attorney, Agent, or Firm—Nixon & Vanderhye, PC

(57) ABSTRACT

A communication navigation system includes a server that transmits route guidance information to terminal units via a communication network, and a transmitter/receiver, provided in each terminal unit, for transmitting specification data that specifies a type of necessary route guidance information, to the server via the communication network. The server transmits only the route guidance information of the type specified by the specification data, to the terminal unit.

10 Claims, 7 Drawing Sheets

COMMUNICATION NAVIGATION SYSTEM, COMMUNICATION NAVIGATION METHOD, ROUTE GUIDANCE INFORMATION TRANSMITTING DEVICE, AND TERMINAL UNIT

BACKGROUND OF THE INVENTION

1. Field of the Invention

The present invention relates to communication navigation systems and methods, etc. for performing navigation by transmitting map data to navigation terminals via a communication network. More particularly, the invention is directed to a communication-efficient communication navigation system and method, etc.

2. Description of Related Art

Various types of navigation systems have been proposed, which perform navigation by transmitting map data and route guidance information from a server, via computer and mobile communications networks including the Internet, to various types of navigation terminals, such as in-vehicle navigation units, portable navigation units, PDAs (Personal Digital Assistants) and cellular telephones, according to their request. Each of these navigation terminals presents a user with predetermined information visibly and audibly, based on position data detected by a GPS (Global Positioning System) receiver mounted thereon as well as map data and route guidance information transmitted from the server, to guide the user to his or her destination.

In these communication navigation systems, the route guidance information transmitted from the server plays an important role in guiding the user to his or her destination, together with the map data. However, each navigation terminal accepts only a type of route guidance information which is uniquely compatible with itself. If the server sends all types of guidance data to each of all the navigation terminals, the server must handle a vast volume of data for transmission to increase its transmission cost and time.

SUMMARY OF THE INVENTION

An object of the invention is to provide a communication navigation system and method, etc. capable of reducing the volume of transmission data when each of navigation terminals involved accepts only such route guidance information as being uniquely compatible with itself.

A first aspect of the invention provides a communication navigation system that performs navigation, using map data stored in a map database site and current position data about navigation terminals, by transmitting the map data to the navigation terminals via a communication network. The communication navigation system is provided with: a route guidance information transmitting device which transmits route guidance information to each of the navigation terminals via the communication network; and an information specifying device, provided at each of the navigation terminals, which transmits specification data for specifying a type of necessary route guidance information, to the route guidance information transmitting device via the communication network, wherein the route guidance information transmitting device transmits only the route guidance information of the type specified by the specification data, to each of the navigation terminals.

According to this communication navigation system, the route guidance information transmitting device transmits to each navigation terminal only route guidance information of a type specified by specification data. Thus, when each navigation terminal accepts only the route guidance information uniquely prepared therefor, no incompatible, useless route guidance information is transmitted to the navigation terminal. Therefore, the volume of route guidance information for transmission can be reduced, which in turn results in reduced communication cost and time.

It should be noted that the term "type of route guidance information" is herein construed to include any type of display (types of items) for use in route guidance.

Another aspect of the invention provides the communication navigation system, wherein the route guidance information transmitting device includes a storage device which stores the type of route guidance information necessary for each of the navigation terminals in association with identification information for identifying each of the navigation terminals, each of the navigation terminals transmits the identification information as the specification data to the information specifying device, and the route guidance information transmitting device transmits only the route guidance information of the type stored while associated with the identification information transmitted from the information specifying device, to each of the navigation terminals.

In this case, the route information transmitting device can acquire a type of route guidance information for transmission, based on the identification information transmitted from the information specifying device.

Still another aspect of the invention provides a communication navigation method for performing navigation, using map data stored in a map database site and current position data about navigation terminals, by transmitting the map data to the navigation terminals via a communication network. The communication navigation method is provided with: an information specifying process for transmitting specification data for specifying a type of necessary route guidance information, from each of the navigation terminals to a route guidance information transmitting device via the communication network; and a route guidance information transmitting process for transmitting only the route guidance information of the type specified by the specification data, from the route guidance information transmitting device to each of the navigation terminals via the communication network.

According to this communication navigation method, the route guidance information transmitting device transmits to each navigation terminal only route guidance information of a type specified by specification data. Thus, when each navigation terminal accepts only the route guidance information uniquely prepared therefor, no incompatible, useless route guidance information is transmitted to the navigation terminal. Therefore, the volume of route guidance information for transmission can be reduced, which in turn results in reduced communication cost and time.

Yet another aspect of the invention provides a route guidance information transmitting apparatus that executes a communication navigation method for performing navigation, using map data stored in a map database site and current position data about navigation terminals, by transmitting the map data to the navigation terminals via a communication network, wherein the route guidance information transmitting apparatus transmits only the route guidance information of the type specified by specification data transmitted from each of the navigation terminals, to each of the navigation terminals via the communication network.

According to this route guidance information transmitting apparatus, only route guidance information of a type specified by specification data is transmitted to each navigation terminal. Thus, when each navigation terminal accepts only the route guidance information uniquely prepared therefor, no incompatible, useless route guidance information is transmitted to the navigation terminal. Therefore, the volume of route guidance information for transmission can be reduced, which in turn results in reduced communication cost and time.

Further aspect of the invention provides a terminal unit that executes a communication navigation method for performing navigation, using map data stored in a map database site and current position data about navigation terminals, by transmitting the map data to the navigation terminals via a communication network, wherein the terminal unit transmits specification data for specifying a type of necessary route guidance information to a route guidance information transmitting device via the communication network, the route guidance information transmitting device for transmitting only the route guidance information of the type specified by the specification data to each of the navigation terminals via the communication network.

According to this terminal unit, the route guidance information transmitting device transmits to each terminal unit only route guidance information of a type specified by specification data. Thus, when each terminal unit accepts only the route guidance information uniquely prepared therefor, no incompatible, useless route guidance information is transmitted to the terminal unit. Therefore, the volume of route guidance information for transmission can be reduced, which in turn results in reduced communication cost and time.

DETAILED DESCRIPTION OF THE PREFERRED EMBODIMENT

A preferred embodiment of the present invention will now be described with reference to the drawings. In the following description, the preferred embodiment refers to a case where the invention is applied to a navigation system which includes terminal units mounted on vehicles, a server connected to the terminal units via a network such as the Internet, and the network, and which assists in driving the vehicles.

(General Configuration and Operation)

Referring to FIGS. 1 to 4, the general configuration and operation of the navigation system according to this embodiment will be described.

Figure 1A:
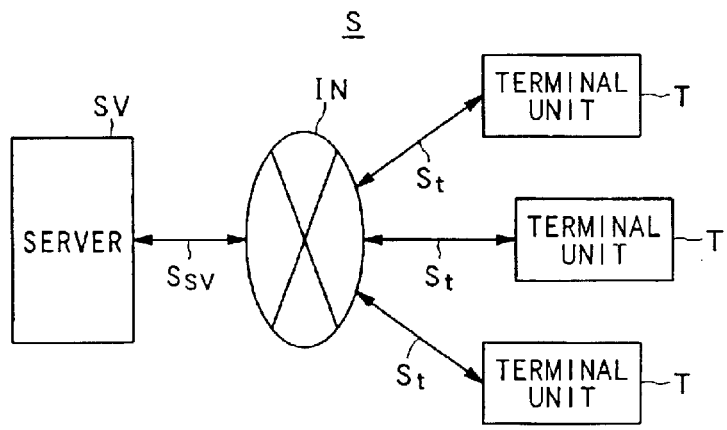
FIG. 1A is a block diagram showing the general configuration of a navigation system according to an embodiment of the invention.

As shown in FIG. 1A, the navigation system S according to this embodiment is provided with terminal units T, and a server SV. Each terminal unit T sends to the server SV a terminal signal St indicative of information such as vehicle's current position and travelling direction, as well as a request for information to be presented to a driver, and also receives from the server SV a terminal signal St indicative of various navigation process information corresponding to the request, and presents the requested information to the driver. Upon receipt of the terminal signal St as a server signal Ssv, the server SV searches for map information, etc. to be presented to the driver on the terminal unit T and performs processes (described below) including a route guidance process for his or her vehicle on which the terminal unit T is mounted, based on the received server signal Ssv, and then sends the processed results as a server signal Ssv to the terminal unit T. The terminal unit T and the server SV communicate with each other via the Internet IN.

As shown in FIG. 1A, only one sever SV is connected to a plurality of terminal units T so that the server SV can send to the terminal units T map and other information on a time division basis.

Figure 1B:
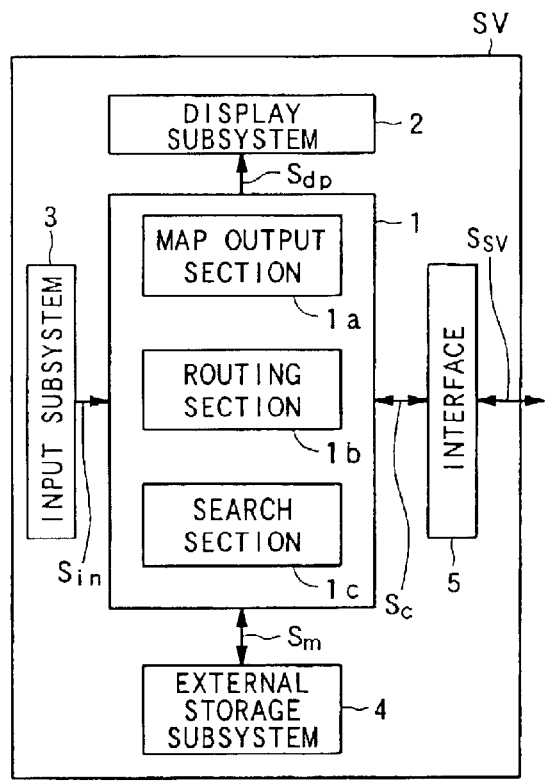
FIG. 1B is a block diagram showing a detailed configuration of a server according to the embodiment.
Figure 1C:
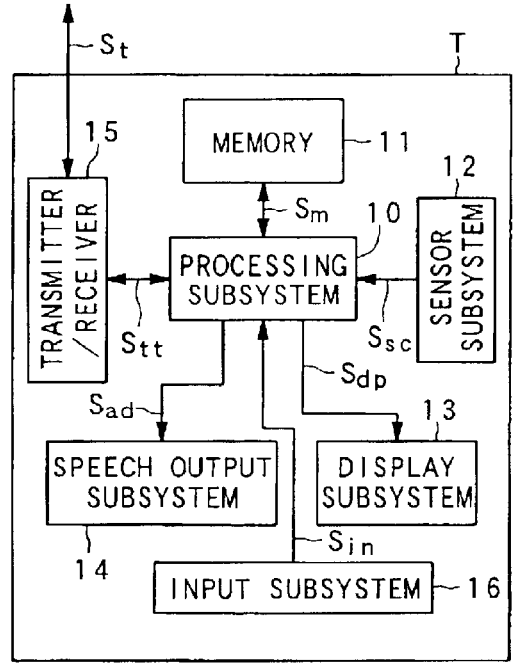
FIG. 1C is a block diagram showing a detailed configuration of a terminal unit according to the embodiment.

Referring next to FIGS. 1B and 1C, the detailed configuration of the navigation system S will be described.

As shown in FIG. 1B, the server SV comprises a CPU 1, a display subsystem 2, an input subsystem 3, an external storage subsystem 4 such as a hard drive, and an interface 5.

In the above configuration, the interface 5 appropriately interfaces an input server signal Ssv from the Internet IN to output the signal Ssv to the CPU 1 as a to-be-processed server signal Sssv, and also appropriately interfaces a processed server signal Sssv from the CPU 1 to output the signal Sssv to a terminal unit T as a server signal Ssv via the Internet IN.

The external storage subsystem 4 stores all information requisite for a navigation process performed by the navigation system S according to this embodiment, and outputs such information to the CPU 1 as a memory signal Sm, as needed. The information includes map information for display on each terminal unit T, various information used for a routing process (described below), point information for performing the navigation process according to this embodiment (more specifically, position information about points indicated on a map for display on the terminal unit T and descriptions of these points), and information about a user of the terminal unit T.

The CPU 1 is provided with a map output section 1a, a routing section 1b, and a search section 1c for its processing.

The map output section 1a searches for and reads, based on the request input as the to-be-processed server signal Sssv, map information corresponding to the request from among the map information stored in the external storage subsystem 4 as a memory signal Sm, and outputs the memory signal Sm to the terminal unit T via the interface 5 and the Internet IN as a processed server signal Sssv.

The routing section 1b calculates and finds, based on the request input as the to-be-processed server signal Sssv, a route along which the vehicle should travel, using the map information stored in the external storage subsystem 4, searches and reads the map information including the calculated and found route as a memory signal Sm, and outputs the memory signal Sm to the terminal unit T via the interface 5 and the Internet IN as a processed server signal Sssv.

Concurrently therewith, the routing section 1b generates route guidance information for guiding the vehicle having the terminal unit T aboard to move along the searched route, and outputs the searched result to the terminal unit T via the interface 5 and the Internet IN as a processed server signal Sssv. As will be described below, in this embodiment, the route guidance information to be sent via the Internet IN is not common to all the terminal units T connected to the system S, but is unique to each unit T.

The search section 1c searches for and reads, as a memory signal Sm, the point information, etc. stored in the external storage subsystem 4 based on the request input as the to-be-processed server signal Sssv, and outputs the memory signal Sm to the terminal unit T via the interface 5 and the Internet IN as a processed server signal Sssv.

The input subsystem 3 generates, upon entry of information necessary for the above operations, an input signal Sin corresponding to the entered information, and outputs the generated input signal Sin to the CPU 1. After having received the signal Sin, the CPU 1 performs its processing accordingly.

Information to be presented to an operator of the server SV during the above operations is output to the display subsystem 2 as a display signal Sdp so that information corresponding to the display signal Sdp is displayed on the display subsystem 2.

Then, as shown in FIG. 1C, a terminal unit T is provided with a processing subsystem 10 including a CPU and a memory, a memory 11, a sensor subsystem 12, a display subsystem 13, a speech output subsystem 14, a transmitter/receiver 15 such as a cellular telephone, and an input subsystem 16.

In this configuration, the transmitter/receiver 15 appropriately interfaces an input terminal signal St from the Internet IN to output a to-be-processed terminal signal Stt to the processing subsystem 10, and similarly interfaces a processed terminal signal Stt from the processing subsystem 10 to output a terminal signal St to the server SV via the Internet IN.

The sensor subsystem 12 is provided with a GPS receiver, a vehicle-speed sensor, and an acceleration sensor, and outputs information indicative of the vehicle's current position and attitude, etc. from the receiver and sensors, to the processing subsystem 10 as a sensor signal Ssc. The GPS receiver outputs absolute position information (absolute geographical latitude and longitude data) about a vehicle carrying the terminal unit T aboard, based on position information contained in GPS radio waves from a GPS satellite in orbit. The vehicle-speed sensor outputs distance and speed information by computing a distance traveled and a vehicle's speed based on so-called vehicle-speed pulses from a front wheel of the vehicle. The acceleration sensor detects turning angles and vertical inclinations of the vehicle to output information about the vehicle's travelling direction.

The input subsystem 16 generates, upon specification of a map for display on the display subsystem 13 or upon specification of a setting for the navigation process according to this embodiment such as a destination, an input signal Sin corresponding to the specification, and outputs the generated input signal Sin to the processing subsystem 10.

Based on these signals Ssc and Sin, the processing subsystem 10 generates information including current position information about the vehicle carrying the terminal unit T aboard, as well as a request, etc. corresponding to the specification made at the input subsystem 16. Then, the processing subsystem 10 outputs such generated information, request, etc. as a to-be-processed terminal signal Stt to the server SV via the transmitter/receiver 15.

Upon receipt of a processed terminal signal Stt via the Internet IN and the transmitter/receiver 15 from the server SV that has processed the to-be-processed signal Stt based on the current position information, request, etc., the processing subsystem 10 outputs the map information contained in the received processed terminal signal Stt to the display subsystem 13 as a display signal Sdp to display the map information thereon. The display subsystem 13 additionally displays information such as map information along the route generated by the routing section 1b within the server SV or routing information based on the route guidance information.

Of the route guidance information, audible messages to be given to the driver of the vehicle are output to the speech output subsystem 14 as an audio signal Sad, to implement the route guidance.

The processing subsystem 10 temporarily stores some information, such as the map information sent from the server SV, in the memory 11 as a memory signal Sm, which is then read, as needed, for proper indicator light processing.

(Navigation Process)

Figure 2:
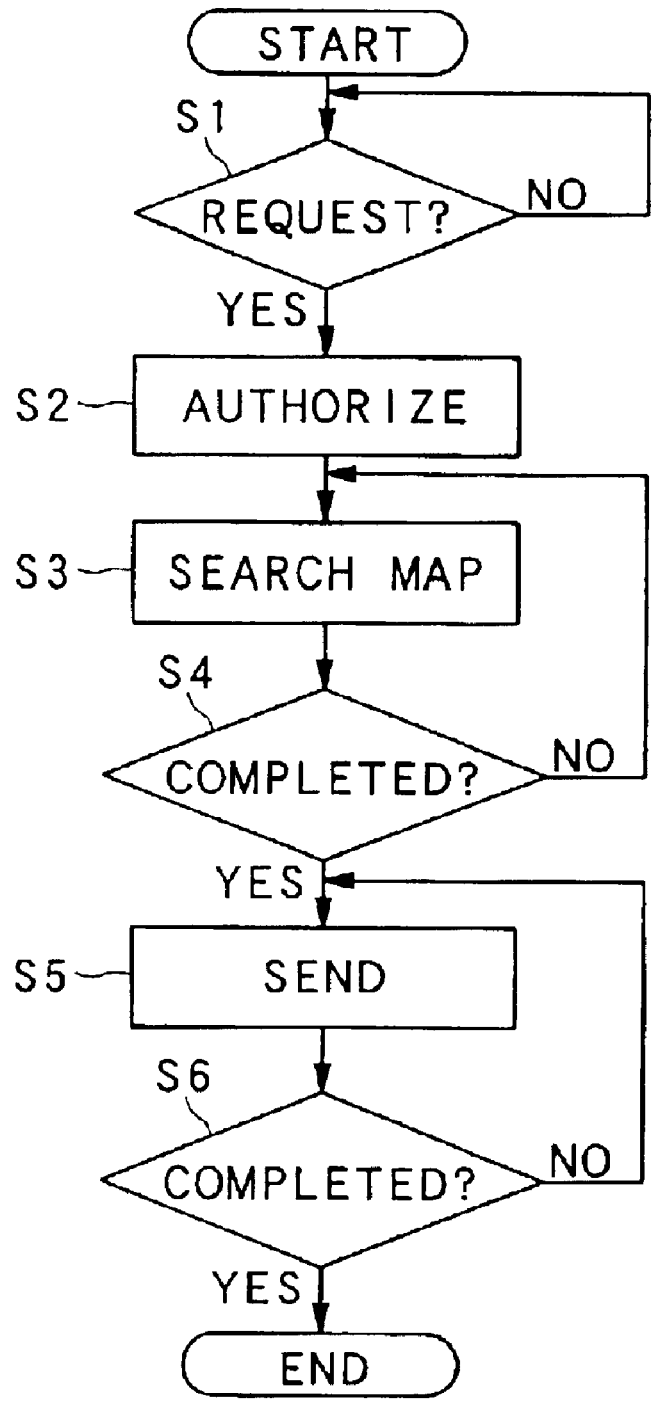
FIG. 2 is a flowchart showing a map search process according to the embodiment.
Figure 3A:
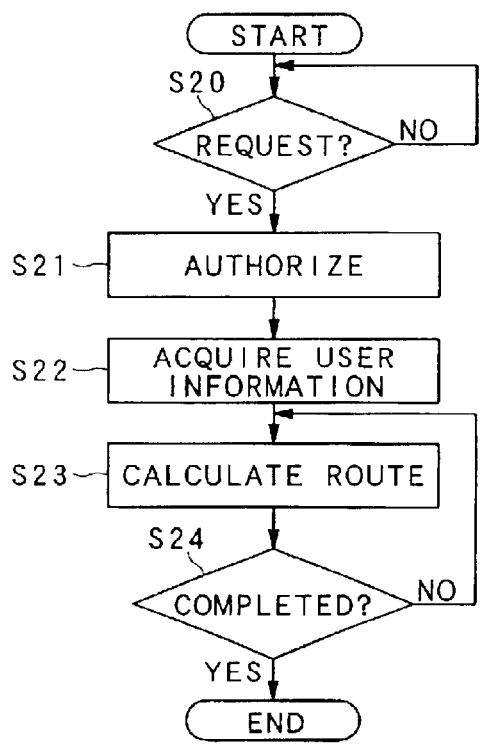
FIG. 3A is a flowchart showing a route calculation process according to the embodiment.
Figure 3B:
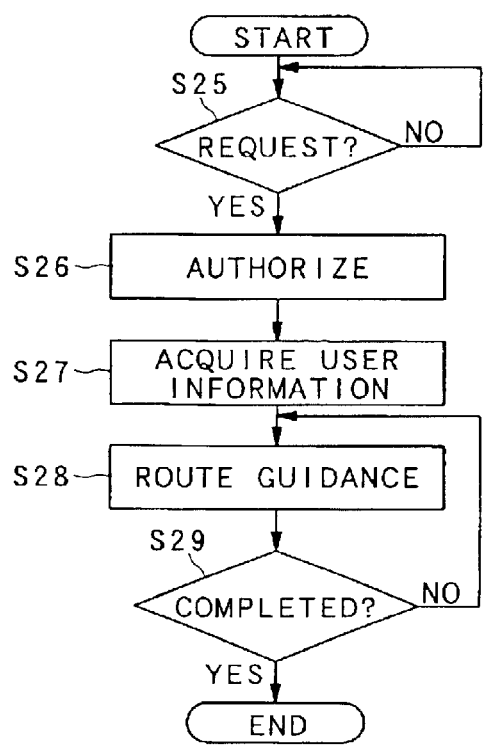
FIG. 3B is a flowchart showing a route guidance process according to the embodiment.
Figure 4:
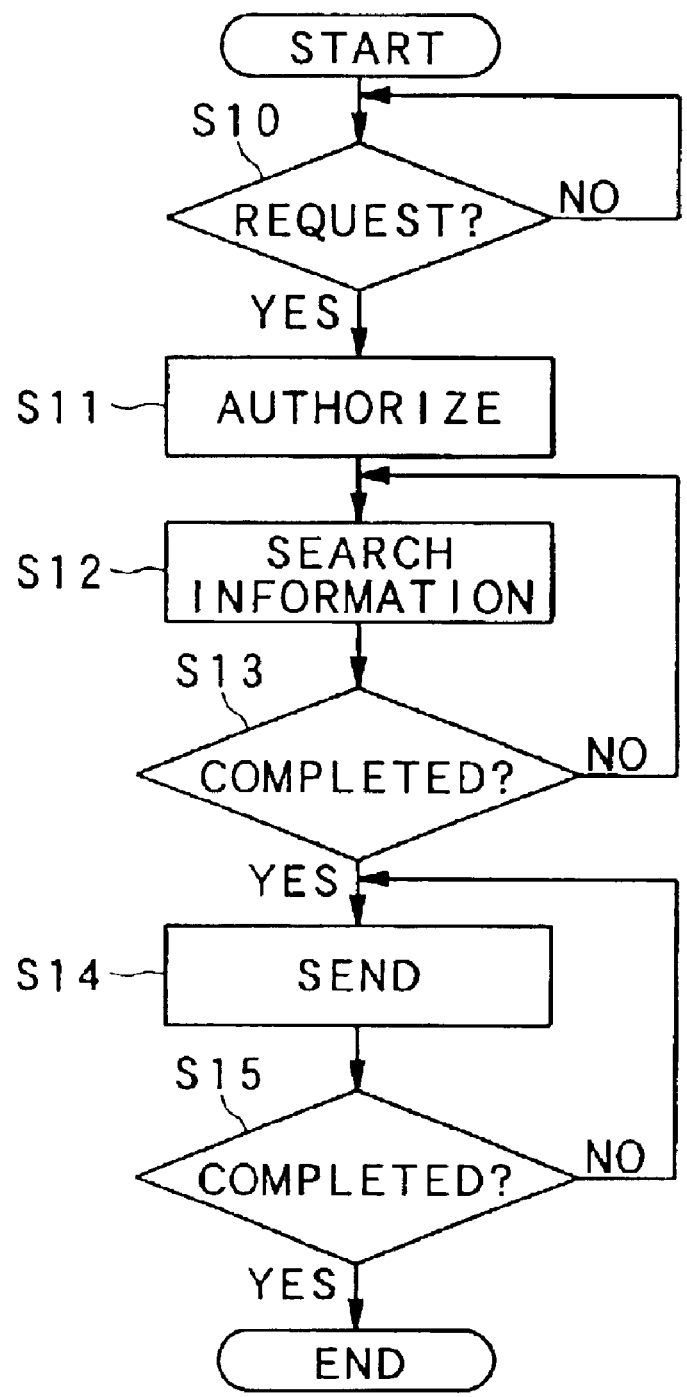
FIG. 4 is a flowchart showing an information search process according to the embodiment.
Figure 5:
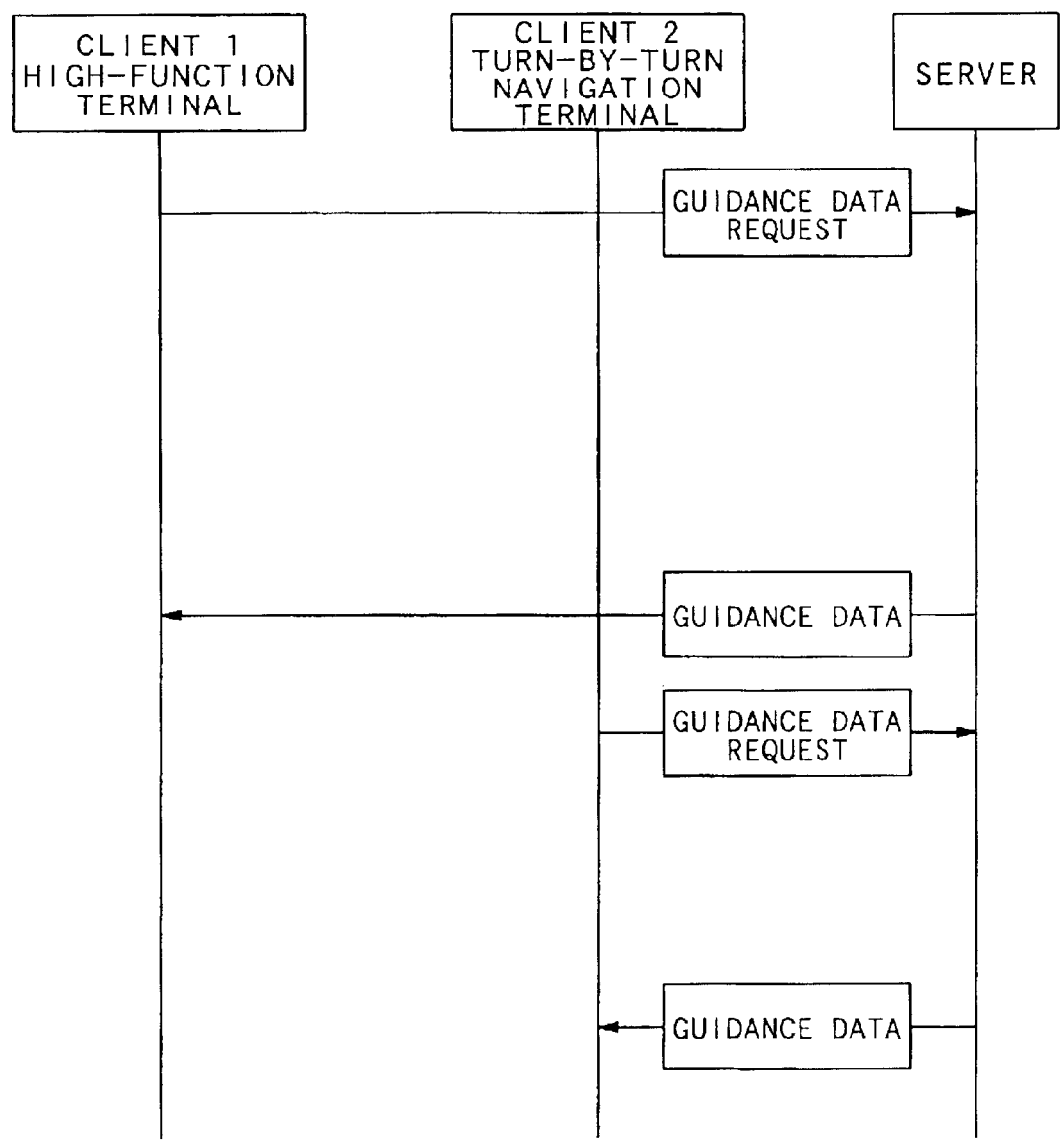
FIG. 5 is a diagram showing a flow of transmission steps for route guidance information.

The navigation process to be performed by the navigation system S having the above configuration will be described. Referring to FIGS. 2 to 4, the description starts with steps taken by the server SV.

Referring to the flowchart shown in FIG. 2, a map search process will be described, in which steps are taken to search a map for display on the display subsystem 13 of any of the terminal units T.

In the map search process, the server SV constantly checks whether or not any terminal unit T sends a request for a map for display (step S1). If not (step S1; NO), the server SV waits. If so (step S1; YES), the server SV determines whether or not the requesting terminal unit T is authorized by the navigation system S according to this embodiment (step S2).

Upon completion of the authorization step, the server SV causes the map output section 1a to search for appropriate map information based on the received request by referring to the map information stored in the external storage subsystem 4 (steps S3 and S4). When the search step S4 is completed (step S4; YES), the searched map information is sent to the terminal unit T (step S5).

The server SV keeps checking whether or not all of the map information has been sent (step S6). If not (step S6; NO), the server SV continues sending the rest of the information, and if so (step S6; YES), it brings the series of map search steps to an end.

Referring next to the flowchart shown in FIG. 3A, a route calculation process will be described, in which steps are taken to calculate a route along which to guide a vehicle carrying any of the terminal units T thereon.

In the route calculation process, the server SV always checks whether or not a request containing a place of departure, a destination, and routing conditions (more specifically, whether or not highways are preferred, or calculations are to be made so that the vehicle drives along specific roads, etc.) has been sent from any terminal unit T (step S20). If not (step S20; NO), the server SV waits, and if so (step S20; YES), the server SV then determines whether or not that requesting terminal unit T is authorized by the navigation system S according to this embodiment (step S21).

Upon completion of the authorization step, the server SV extracts and acquires user information related to a user who owns the authorized terminal unit T from the external storage subsystem 4 (step S22), and then causes its routing section 1b to perform prescribed route calculation steps based on the destination, etc. contained in the request as well as the acquired user information (steps S23 and S24). When these route calculating steps are completed (step S24; YES), the server SV temporarily loads the calculated route information into the memory within the CPU 1, to terminate the route calculation process. The server SV may send the calculated route information to the terminal unit T so that the unit T causes its display subsystem 13 to display the received route information thereon.

Referring then to the flowchart shown in FIG. 3B, a route guidance process will be described, in which steps are taken to guide a vehicle along the calculated route, the vehicle carrying any of the terminal units T aboard.

In the route guidance process, the server SV constantly checks whether or not the terminal unit T has sent a request for starting route guidance (step S25). If not (step S25; NO), the server SV waits, and if so (step S25; YES), it determines whether or not the requesting terminal unit T is authorized by the navigation system S according to this embodiment (step S26).

Upon completion of the authorization step, the server SV extracts and acquires user information related to a user who owns the authorized terminal unit T from the external storage subsystem 4 for confirmation (step S27), and causes its routing section 1b to perform prescribed route guidance steps (steps S28 and S29) according to the request. Upon completion of the route guidance process (step S29; YES), the server SV terminates the route guidance process, which includes a step of acquiring current position information indicative of the vehicle's current position, a step of determining whether or not the acquired current position is on the previously calculated route, and a step of calculating the relationship between the vehicle's current position and a point of interest (an intersection for turn, a landmark, or the like) along the route, and sending the calculated relationship to the terminal unit T to inform the driver of the calculated relationship.

In step S28, the server SV sends each requesting terminal unit T only route guidance information uniquely compatible with that unit T, which will be described in more detail below.

Referring next to the flowchart shown in FIG. 4, an information search process will be described, in which steps are taken to search information which is to be given to the driver of any of the terminal units T and which is related to the navigation process.

In the information search process, the server SV keeps checking whether or not any terminal unit T has sent a request for information to be given to the driver (step S10). If not (step S10; NO), the server SV waits. If so (step S10; YES), the server SV determines whether or not that requesting terminal unit T is authorized by the navigation system S according to this embodiment (step S11).

Upon completion of the authorization step, the server SV then causes its search section 1c to search for appropriate information from among the information stored in the external storage subsystem 4 based on the received request (steps S12 and S13). When the search is completed (step S13; YES), the server SV sends the searched information to the terminal unit T (step S14).

In the meantime, the server keeps checking whether or not all of the searched information has been sent (step S15). If not (step S15; NO), the server SV continues sending the rest of the information, and if so (step S15; YES), it brings the series of information search steps to an end.

Referring next to FIGS. 5 to 8, the route guidance information sending step S28 in the route guidance process (see FIG. 3B) will be described.

In this embodiment, the server SV sends route guidance information to any terminal unit T that is requesting the server SV to do so. The type of route guidance information sent from the server SV is unique to each requesting terminal unit. FIGS. 5 to 8 refer to an example in which the server SV sends guidance data about intersections to a high-function terminal unit and a turn-by-turn navigation terminal unit in response to their requests (which are equivalent to the request under check in step S25 of FIG. 3B).

Figure 6:
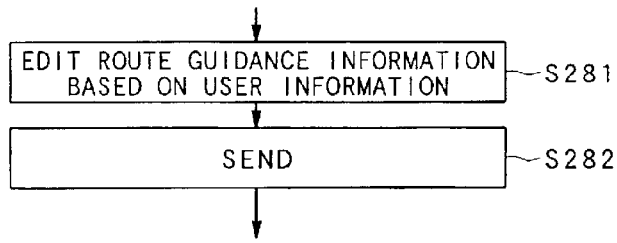
FIG. 6 is a flowchart showing the transmission steps.
Figure 7:
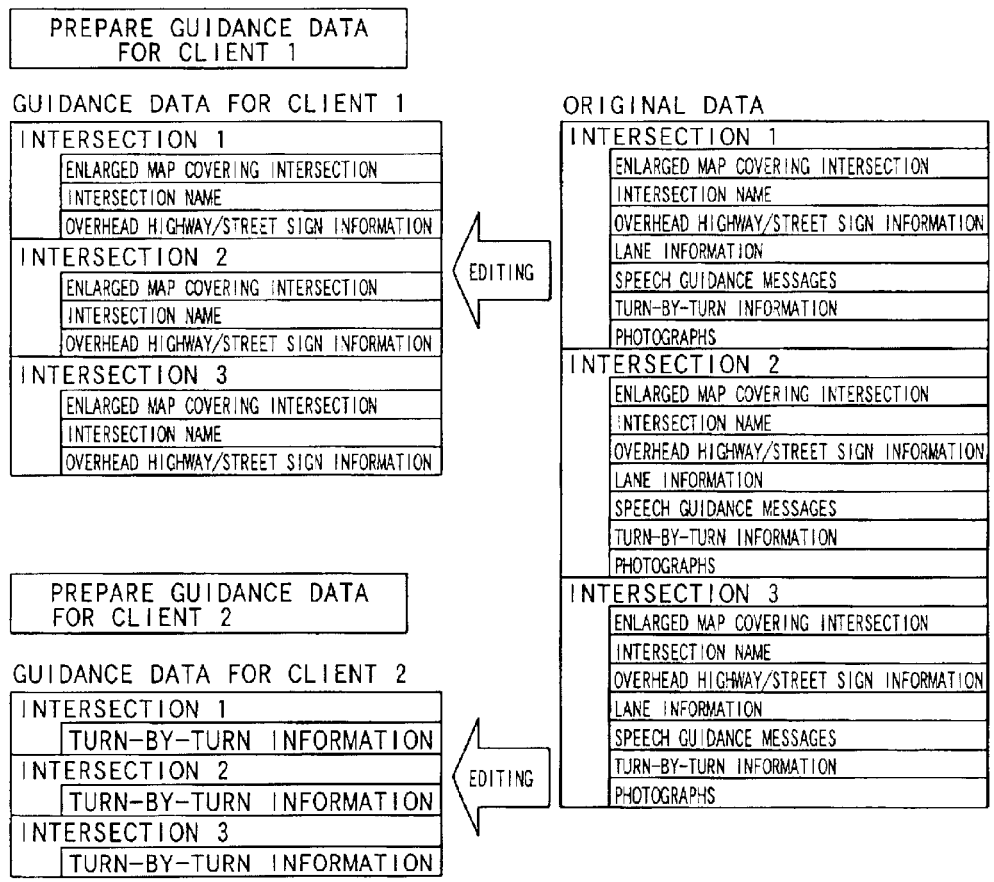
FIG. 7 is a diagram showing guidance data to be edited for each terminal unit.

In a route guidance information sending step S281 of FIG. 6, the server SV selects proper items of route guidance information for each requesting terminal unit. For example, in response to a guidance data request from the high-function terminal unit, the server SV sends information such as an enlarged map covering intersections, intersection names, and overhead highway/street sign information to the high-function terminal unit. These items of information are appropriately selected from original data stored in the external storage subsystem 4, and then edited. The original data includes, in addition to the above items of information sent to the high-function terminal unit, lane information, speech guidance messages, turn-by-turn information, and photographs. FIG. 7 refers to an example in which route guidance information about three (3) intersections is edited collectively.

In response to a guidance data request from the turn-by-turn navigation terminal unit, the server SV sends only turn-by-turn information, which is prepared by selecting proper items of information from the original data and editing the selected items of information.

Next, in step S282, the server SV sends the edited route guidance information to the corresponding ones of the terminal units via the Internet IN. That is, the server SV sends no other information than the enlarged map covering intersections, intersection names, and overhead highway/street sign information to the high-function terminal, and no other information than the turn-by-turn information to the turn-by-turn navigation terminal unit.

Figure 8A:
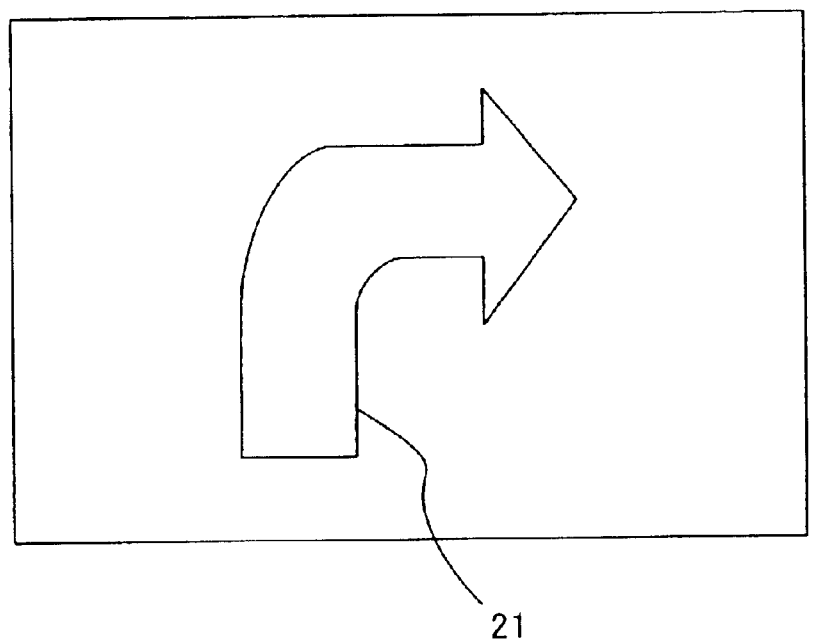
FIG. 8A is a diagram showing a display on a turn-by-turn navigation terminal unit.
Figure 8B:
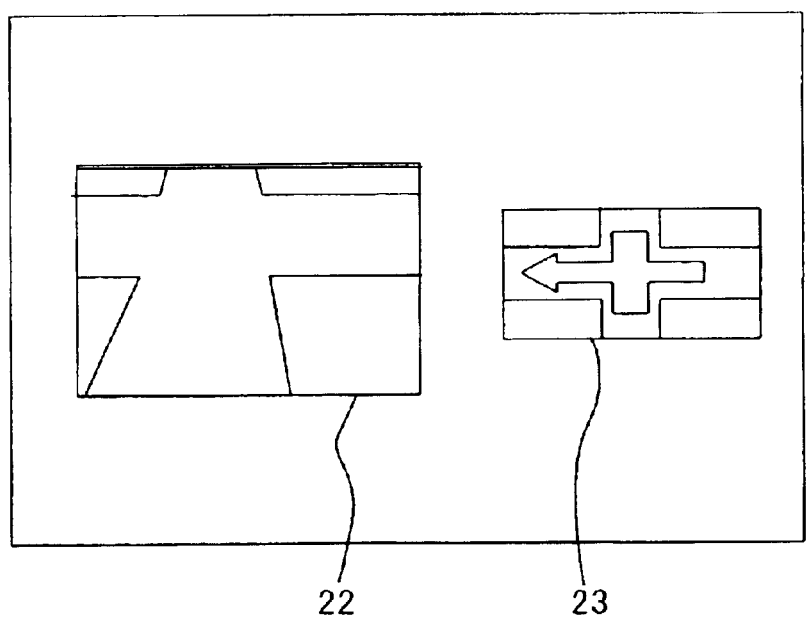
FIG. 8B is a diagram showing a display on a high-function terminal unit.

Predetermined items, etc. are displayed on the display subsystem 13 of each of the terminal units based on the received route guidance information. FIG. 8A shows a display for the turn-by-turn navigation terminal unit. FIG. 8B shows a display for the high-function terminal unit, whose driver can view both three-dimensional and two-dimensional pictures 22 and 23. In FIGS. 8A and 8B, details of these displays are omitted.

Thus, in this embodiment, each requesting terminal unit receives only the type of route guidance information unique to itself; it receives no information that is incompatible and useless. This permits the navigation system S to reduce communication cost and time.

The type of route information compatible with and usable by a terminal unit is uniquely defined by the type of the terminal unit. The type of a terminal unit requesting guidance data can be identified based on the request sent by that terminal unit and by referring to information recorded in the external storage subsystem 4. For example, the storage subsystem 4 stores different types of route guidance information to be sent to different types of terminal units by associating the terminal units with identification information that uniquely identifies them, and what the terminal units should do is to send their identification information to the server SV. The server SV then sends only the type of route guidance information associated with the received identification information, to each terminal unit.

The type of route information to be sent to each requesting terminal unit may be specified as instructed by the terminal unit. In this case, the instruction from the terminal unit can be stored in the external storage subsystem 4 for any future reference.

According to the communication navigation system, etc. of the invention, the route guidance information transmitting means transmits to each navigation terminal only route guidance information of a type specified by specification data. Thus, when each navigation terminal accepts only the route guidance information uniquely prepared therefor, no incompatible, useless route guidance information is transmitted to the navigation terminal. Therefore, the volume of route guidance information for transmission can be reduced, which in turn results in reduced communication cost and time.

The entire disclosure of Japanese Patent Application No. 2001-232556 filed on Jul. 31, 2001 including the specification, claims, drawings and summary is incorporated herein by reference in its entirety.

What is claimed is:

1. A communication navigation system that comprises a navigation terminal and a server, the server comprising a map database and transmitting route guidance information via a communication network to the navigation terminal using map data stored in the map database and using current position data of the navigation terminal, wherein the navigation terminal comprises:

an input device for inputting type designation data for designating one of a high-function type and a turn-by-turn type of route guidance information; and an information specifying device which transmits identification information including the type designation data for specifying the route guidance information, and wherein the server further comprises:

a route guidance information transmitting device which transmits route guidance information associated with the identification information which is transmitted from the navigation terminal.

2. A communication navigation method for use in a communication navigation system that comprises a navigation terminal and a server, the server comprising a map database and transmitting via a communication network route guidance information to the navigation terminal using map data stored in the map database and using current position data about the navigation terminal, the communication navigation method comprising:

an input process at the navigation terminal for inputting type designation data for designating one of a high-function type and a turn-by-turn type of route guidance information;

an information specifying process at the navigation terminal for transmitting identification information including the type designation data for specifying the route guidance information; and a route guidance information transmitting process at the server for transmitting the route guidance information associated with the identification information which is transmitted from the navigation terminal.

3. A route guidance information transmitting apparatus that executes a communication navigation method for transmitting route guidance information to a navigation terminal via a communication network, wherein the communication navigation method comprises a route guidance information transmitting process for transmitting the route guidance information to the navigation terminal, and the route guidance information is associated with identification information which is transmitted from the navigation terminal and includes type designation data for designating one of a high-function type and a turn-by-turn type of route guidance information.

4. A navigation system comprising:

a navigation terminal; and a server for transmitting route guidance information to the navigation terminal via a communication network, wherein the navigation terminal comprises a transmitting device for transmitting a route guidance request to the server over the communication network, the route guidance request including terminal identification data identifying the navigation terminal, and the server comprises a receiving device for receiving the route guidance request including the terminal identification data from the navigation terminal, a processing system for processing the received route guidance request to generate route guidance information that is responsive to the route guidance request and to determine one of a high-function type and a turn-by-turn type of route guidance information to transmit to the navigation terminal based on the terminal identification data, and a transmitting device for transmitting to the navigation terminal the route guidance information that is responsive to the route guidance request and is of the determined type of route guidance information.

5. The navigation system according to claim 4, further comprising:

a storage device that is part of or accessible to, the processing system of the server, the storage device storing data that designates the type of route guidance information to be transmitted to the navigation terminal, wherein the processing system determines the type of route guidance information to be transmitted to the navigation terminal based on the data stored in the storage device.

6. The navigation system according to claim 5, wherein the navigation terminal further comprises an input device for inputting data designating one of the high-function type and the turn-by-turn type of route guidance information to be sent to the navigation terminal, the transmitting device of the navigation terminal transmits the input data to the server and the processing system of the server stores the received input data in the storage device and subsequently accesses the stored input data to determine the type of route guidance information to transmit to the navigation terminal.

7. The navigation system according to claim 4, wherein the navigation terminal comprises a vehicle navigation terminal.

8. The navigation system according to claim 4, wherein the high-function type of route guidance information comprises intersections, intersection names and sign information and the turn-by-turn type of route guidance information is limited to turn-by-turn information.

9. A server for a navigation system comprising:

a receiving device for receiving a route guidance request from a navigation terminal, wherein the route guidance request includes terminal identification data identifying the navigation terminal;

a processing system for processing the received route guidance request to generate route guidance information that is responsive to the route guidance request and to determine one of a high-function type and a turn-by-turn type of route guidance information to transmit to the navigation terminal based on the terminal identification data; and a transmitting device for transmitting to the navigation terminal the route guidance information that is responsive to the route guidance request and is of the determined type of route guidance information.

10. A process for use in a navigation system comprising a navigation terminal and a server, the process comprising:

transmitting a route guidance request to the server over a communication network, wherein the route guidance request includes terminal identification data identifying the navigational terminal;

receiving the route guidance request at the server;

processing the route guidance request at the server to generate route guidance information that is responsive to the route guidance request and to determine one of a high-function type and a turn-by-turn type of route guidance information to transmit to the navigation terminal based on the terminal identification data; and transmitting from the server to the navigation terminal the route guidance information that is responsive to the route guidance request and is of the determined type of route guidance information.

* * * * *